United States Patent
Muramatsu et al.

(10) Patent No.: US 8,121,713 B2
(45) Date of Patent: Feb. 21, 2012

(54) ELECTRONIC APPARATUS, METHOD FOR GENERATING DIGITAL SIGNAL, DIGITAL SIGNAL RECORDING MEDIUM, AND SIGNAL PROCESSING APPARATUS

(75) Inventors: Akihiro Muramatsu, Shizuoka (JP); Akihiko Suyama, Irvine, CA (US)

(73) Assignee: Yamaha Corporation (JP)

( * ) Notice: Subject to any disclaimer, the term of this patent is extended or adjusted under 35 U.S.C. 154(b) by 1377 days.

(21) Appl. No.: 11/663,008

(22) PCT Filed: Sep. 15, 2005

(86) PCT No.: PCT/JP2005/017044
§ 371 (c)(1),
(2), (4) Date: Mar. 15, 2007

(87) PCT Pub. No.: WO2006/030860
PCT Pub. Date: Mar. 23, 2006

(65) Prior Publication Data
US 2008/0005540 A1    Jan. 3, 2008

(30) Foreign Application Priority Data

Sep. 15, 2004  (JP) ................................. 2004-268248
Sep. 15, 2004  (JP) ................................. 2004-268249

(51) Int. Cl.
*G06F 17/00* (2006.01)

(52) U.S. Cl. ........................................................ 700/94

(58) Field of Classification Search ...................... 700/94
See application file for complete search history.

(56) References Cited

U.S. PATENT DOCUMENTS

| | | | |
|---|---|---|---|
| 7,483,979 B1 * | 1/2009 | Prager | 709/225 |
| 2004/0039832 A1 * | 2/2004 | Hidaka et al. | 709/230 |
| 2005/0149572 A1 * | 7/2005 | Kanai et al. | 707/104.1 |
| 2006/0184532 A1 * | 8/2006 | Hamada et al. | 707/10 |

FOREIGN PATENT DOCUMENTS

| | | |
|---|---|---|
| JP | 7-21615 A | 1/1995 |
| JP | 2002-149428 A | 5/2002 |
| JP | 2003-36650 A | 2/2003 |
| JP | 2003-91428 A | 3/2003 |
| JP | 2004-164006 A | 6/2004 |

OTHER PUBLICATIONS

ID3 draft specification.*
ISO/IEC 11172-3.*
Relevant portion of International Search Report, mailed on Oct. 25, 2005, of corresponding PCT application No. PCT/JP2005/017044.

* cited by examiner

*Primary Examiner* — Curtis Kuntz
*Assistant Examiner* — Paul McCord
(74) *Attorney, Agent, or Firm* — Rossi, Kimms & McDowell LLP

(57) ABSTRACT

An electronic apparatus having a CPU for controlling each portion of the apparatus has a storage unit for storing at least one of firmware or data to be used by the CPU, an input terminal to which a digital signal with a predetermined format is input, a processing unit for performing a predetermined process on the digital signal input from the input terminal, an extracting unit for extracting data located at predetermined timings in one frame of the digital signal input from the input terminal, and outputting the data as extracted data, and a rewriting unit for analyzing the extracted data and rewriting at least one of the firmware or the data in the storage unit based on a result of the analysis and the extracted data. The CPU at least serves as the extracting unit.

8 Claims, 9 Drawing Sheets

(TABLE 1)

4-BIT DIVISION

| | | | |
|---|---|---|---|
| 0000 | 0000 | 0000 | 0000 |
| 0000 | 0000 | 0000 | 1111 |
| 0000 | 0000 | 1111 | 0000 |
| 0000 | 0000 | 1111 | 1111 |
| 0000 | 1111 | 0000 | 0000 |
| 0000 | 1111 | 0000 | 1111 |
| 0000 | 1111 | 1111 | 0000 |
| 0000 | 1111 | 1111 | 1111 |
| 1111 | 0000 | 0000 | 0000 |
| 1111 | 0000 | 0000 | 1111 |
| 1111 | 0000 | 1111 | 0000 |
| 1111 | 0000 | 1111 | 1111 |
| 1111 | 1111 | 0000 | 0000 |
| 1111 | 1111 | 0000 | 1111 |
| 1111 | 1111 | 1111 | 0000 |
| 1111 | 1111 | 1111 | 1111 |

POSITIVE MAX (row 8)
NEGATIVE MAX (row 9)

NOISE RANGING HERE (TABLE 2)

| HEX | DECIMAL NUMBER | SIGNED DECIMAL NUMBER | EMBEDDED DATA |
|---|---|---|---|
| 0000 | 0 | 0 | 0000 |
| 000F | 15 | 15 | 0001 |
| 00F0 | 240 | 240 | 0010 |
| 00FF | 255 | 255 | 0011 |
| 0F00 | 3840 | 3840 | 0100 |
| 0F0F | 3855 | 3855 | 0101 |
| 0FF0 | 4080 | 4080 | 0110 |
| 0FFF | 4095 | 4095 | 0111 |
| F000 | 61440 | -4096 | 1000 |
| F00F | 61455 | -4081 | 1001 |
| F0F0 | 61680 | -3856 | 1010 |
| F0FF | 61695 | -3841 | 1011 |
| FF00 | 65280 | -256 | 1100 |
| FF0F | 65295 | -241 | 1101 |
| FFF0 | 65520 | -16 | 1110 |
| FFFF | 65535 | -1 | 1111 |

MAX 4095
MIN -4096
DIFFERENCE 8191 1FFF
13bit

NOISE LEVEL -18dB

FIG. 7

(TABLE 3)

8-BIT DIVISION

| | | | | |
|---|---|---|---|---|
| POSITIVE MAX | 0000 0000 | 0000 0000 |
| | 0000 0000 | 1111 1111 |
| NEGATIVE MAX | 1111 1111 | 0000 0000 |
| | 1111 1111 | 1111 1111 |

NOISE RANGING HERE (TABLE 4)

| HEX | DECIMAL NUMBER | SIGNED DECIMAL NUMBER | EMBEDDED DATA |
|---|---|---|---|
| 0000 | 0 | 0 | 00 |
| 00FF | 255 | 255 | 01 |
| FF00 | 65280 | -256 | 10 |
| FFFF | 65535 | -1 | 11 |

MAX 255
MIN -256
DIFFERENCE 511   1FF   NOISE LEVEL -42dB
9bit

FIG. 8

(TABLE 5)

16-BIT DIVISION

| | |
|---|---|
| POSITIVE MAX | 0000 0000 0000 0000 |
| NEGATIVE MAX | 1111 1111 1111 1111 |

NOISE LOCATED ONLY HERE (TABLE 6)

| HEX | DECIMAL NUMBER | SIGNED DECIMAL NUMBER | EMBEDDED DATA |
|---|---|---|---|
| 0000 | 0 | 0 | 0 |
| FFFF | 65535 | -1 | 1 |

MAX 0
MIN -1
DIFFERENCE 1   1   NOISE LEVEL -90dB
1bit (TABLE 10)

| HEX | DECIMAL NUMBER | SIGNED DECIMAL NUMBER | EMBEDDED DATA |
|---|---|---|---|
| 000FFF | 4095 | 4095 | 0111 |
| FFF000 | 16773120 | -4096 | 1000 |

DIFFERENCE 8191 1FFF   NOISE LEVEL

13bit   -66dB (TABLE 9)

THE CASE WHERE 4 BITS ARE ACQUIRED ONLY IN ONE SAMPLE OF L
(THE NUMBER OF BITS OF UPPER BLOCK IS INCREASED)

| | | | | | | |
|---|---|---|---|---|---|---|
| POSITIVE MAX | 0000 | 0000 | 0000 | 1111 | 1111 | 1111 |
| NEGATIVE MAX | 1111 | 1111 | 1111 | 0000 | 0000 | 0000 |

NOISE RANGING HERE

FIG. 11

| bit | SOUND PRESSURE LEVEL |
|---|---|
| 1 | -6.02dB |
| 2 | -12.04dB |
| 3 | -18.06dB |
| 4 | -24.08dB |
| 5 | -30.10dB |
| 6 | -36.12dB |
| 7 | -42.14dB |
| 8 | -48.16dB |
| 9 | -54.19dB |
| 10 | -60.21dB |
| 11 | -66.23dB |
| 12 | -72.25dB |
| 13 | -78.27dB |
| 14 | -84.29dB |
| 15 | -90.31dB |
| 16 | -96.33dB |
| 17 | -102.35dB |
| 18 | -108.37dB |
| 19 | -114.39dB |
| 20 | -120.41dB |
| 21 | -126.43dB |
| 22 | -132.45dB |
| 23 | -138.47dB |
| 24 | -144.49dB |

FIG. 12

(TABLE 11)

ORIGINAL DATA

| | | | | |
|---|---|---|---|---|
| MIN | 0001 | 0111 | 1010 | 0101 |
| | 0001 | 0111 | 0000 | 0000 |
| | 0001 | 0111 | 0000 | 1111 |
| | 0001 | 0111 | 1111 | 0000 |
| MAX | 0001 | 1111 | 1111 | 1111 |

NOISE RANGING HERE (TABLE 12)

| HEX | DECIMAL NUMBER | SIGNED DECIMAL NUMBER | EMBEDDED DATA |
|---|---|---|---|
| 17A5 | 6053 | 6053 | |
| 1700 | 5888 | 5888 | 00 |
| 170F | 5903 | 5903 | 01 |
| 17F0 | 6128 | 6128 | 10 |
| 17FF | 6143 | 6143 | 11 |

MAX 6143
MIN 5888
DIFFERENCE 255    FF     NOISE LEVEL  -48dB
                  8bit

FIG. 13

| TRANSMISSION DATA | NUMBER OF DATA |
|---|---|
| ① 10 OR MORE BYTES OF 0x00 | 10 OR MORE |
| ② 0x55 (START IDENTIFIER) | 1 |
| ③ 6 BYTES OF "S" "T" "A" "R" "T" "!" | 6 |
| ④ NUMBER OF TRANSMISSION DATA (FROM NOW ON) | 2 |
| ⑤ 2 BYTES OF COMMAND | 2 |
| ⑥ DATA | x(④-2-2) |
| ⑦ 2 BYTES OF CHECK SUM | 2 |

# ELECTRONIC APPARATUS, METHOD FOR GENERATING DIGITAL SIGNAL, DIGITAL SIGNAL RECORDING MEDIUM, AND SIGNAL PROCESSING APPARATUS

This is a U.S. National Phase Application of PCT International Application PCT/JP2005/017044 filed on Sep. 15, 2005.

TECHNICAL FIELD

The present invention relates to an electronic apparatus for preferable use in rewriting of firmware or the like, a method for generating a digital signal, a digital signal recording medium and a signal processing apparatus for preferable use in rewriting of firmware or the like.

BACKGROUND ART

A CPU operating based on programs is incorporated in an audio apparatus such as an amplifier, a DVD player or the like. Of these programs, programs to be placed between hardware and software are generally referred to as firmware. When the firmware is stored in a flash memory or the like in advance, addition of functions or correction of defects can be performed later.

Patent Document 1 discloses an apparatus as follows. That is, the mode of the apparatus is switched to an upgrade mode to rewrite firmware. Data for rewriting the firmware are input from a digital audio signal input terminal or another terminal. The data are written properly over a reproduction processing program region of a memory. Thus, the firmware is upgraded.
Patent Document 1: JP-A-2002-149428

DISCLOSURE OF THE INVENTION

Problems that the Invention is to Solve

In the apparatus disclosed in Patent Document 1, the format of data for rewriting firmware is different from the format of audio signals. Accordingly, there is a fear that big noise may be reproduced. It is therefore necessary to switch the mode to prevent noise from being reproduced during processing of the rewriting data.

There is also an apparatus in which a terminal of RS232C or the like is used for processing performed by another system than a system of audio signals. However, there is a problem that the processing speed is slow. There is another problem that an expensive and dedicated writer is required for accelerating (synchronously serializing) the processing.

The present invention was developed in consideration of the foregoing situation. An object of the invention is to provide an electronic apparatus, a method for generating a digital signal, a digital signal recording medium and a signal processing apparatus, in which big noise can be prevented from being generated without using any expensive and fast electronic circuit and during rewriting of a program or the like.

Means for Solving the Problems

In order to solve the foregoing problems, the present invention is characterized by any one of the following configurations.

(1) An electronic apparatus having a CPU for controlling each portion of the apparatus, the apparatus comprising:
storage means for storing at least one of firmware and data to be used by the CPU;
an input terminal to which a digital signal with a predetermined format is input;
processing means for performing a predetermined process on the digital signal input from the input terminal;
extracting means for extracting data located at predetermined timings in one frame of the digital signal input from the input terminal, and outputting the data as extracted data; and
rewriting means for analyzing the extracted data and rewriting at least one of the firmware and the data in the storage means based on a result of the analysis and the extracted data;
wherein the CPU serves at least as the extracting means.
(2) The electronic apparatus according to (1), wherein the CPU further serves as the rewriting means.
(3) The electronic apparatus according to (1), wherein the CPU serves as the extracting means and supplies the extracted data to the processing means, and the processing means serves as the rewriting means.
4. The electronic apparatus according to any one of (1) through (3) further comprising buffer storage means for storing the extracted data temporarily, wherein the rewriting means analyzes the extracted data stored in the buffer storage means sequentially, and at least one of the firmware and the data in the storage means is rewritten based on a result of the analysis and the extracted data in the buffer storage means.
(5) The electronic apparatus according to any one of (1) through (4), wherein the predetermined timings are located in sampling points set in respective segments defined by dividing effective data length in the frame into N segments.
(6) The electronic apparatus according to any one of (1) through (4), wherein the predetermined timings are located in sampling points set in M (M is smaller than N) segments defined by dividing effective data length in the frame into N segments.
(7) The electronic apparatus according to any one of (1) through (6), wherein the rewriting means performs the analysis and the rewriting while ignoring, of the extracted data extracted by the extracting means, data located in specific timings.
(8) The electronic apparatus according to any one of (1) through (7), wherein the predetermined format is a digital audio interface standard.
(9) A method of generating a digital signal, comprising the steps of:
dividing effective data length in one frame into N segments each consisting of a plurality of bits; and
disposing consecutive "1" data or consecutive "0" data in each of the segments in accordance with bit values of original data.
(10) The method of generating a digital signal according to (9), wherein the segments are disposed at equal intervals.
(11) The method of generating a digital signal according to (9), wherein the segments include segments having different lengths.
(12) A digital signal recording medium wherein effective data length in one frame is divided into N segments each consisting of a plurality of bits in at least a part of a stored digital signal, and consecutive "1" data or consecutive "0" data are disposed in each of the segments in accordance with bit values of original data.
(13) The digital signal recording medium according to (12), wherein the segments are disposed at equal intervals.

(14) The digital signal recording medium according to (12), wherein the segments include segments having different lengths.

(15) A signal processing apparatus for extracting a digital signal from a digital signal recording medium in which effective data length per frame is divided into N segments in at least a part of a stored digital signal, and consecutive "1" data or consecutive "0" data are disposed in each of the segments in accordance with bit values of original data, the signal processing apparatus being characterized by comprising means for extracting 1-bit data from each of the N segments so as to extract and recognize N-bit data corresponding to the original data.

(16) The signal processing apparatus according to (15), wherein the apparatus is a music playback apparatus.

(17) The signal processing apparatus according to (17), wherein the original data are firmware for the apparatus.

Effect of the Invention

Data at predetermined timings in one frame of a digital signal with a predetermined format the processing means deals with are extracted. The extracted data are analyzed to perform rewriting. Accordingly, it is possible to supply a rewriting program or a rewriting command with the same format as a format used for normal processing.

In addition, since the sampling rate for extracting data at predetermined timings in each frame can be made lower than the sampling rate of the original digital signal, it is possible to support the sampling rate satisfactorily even if the throughput of the extracting means or the processing means is low. This is advantageous particularly when a slow CPU is used as the extracting means or the processing means. In addition, the throughput is as high as that of processing over a divided part of the original digital signal. Accordingly, the total time required for the rewriting can be prevented from increasing extremely, so that a sufficiently satisfactorily speed in practical use can be obtained.

Further, the effective data length per frame is divided into N segments, and consecutive "1" data or consecutive "0" data are disposed in each segment in accordance with bit values of the original data. Accordingly, the present invention can be applied to any format. Thus, for example, when the present invention is applied to a format of a digital audio signal, both the normal digital audio signal and the digital signal generated by the present invention can be processed if the present invention is applied to an apparatus which can process the digital audio signal. Furthermore, in the digital signal according to the present invention, the original signal can be extracted when each segment is read once. A division effect can be obtained as to the reading speed. Thus, the original signal can be extracted if a device whose clock frequency is low is used. In this case, the throughput is as high as that of processing over a divided part of the original digital signal. Accordingly, the total time required for the rewriting can be prevented from increasing extremely even when the present invention is applied to rewriting of firmware, so that a sufficiently satisfactorily speed in practical use can be obtained.

BRIEF DESCRIPTION OF THE DRAWINGS

FIG. 7 shows corresponding tables showing the contents of each frame when 8-bit division is carried out in the embodiment.

FIG. 8 shows corresponding tables showing the contents of each frame when 16-bit division is carried out in the embodiment.

FIG. 11 shows a table showing the state of reduction of noise level when upper bits are not used.

FIG. 12 shows corresponding tables showing the contents of each frame when an audio signal and rewriting data are mixed in one frame.

FIG. 13 is a table showing another example of a rewrite command.

BEST MODE FOR CARRYING OUT THE INVENTION

Configuration of Embodiment

Figure 1:
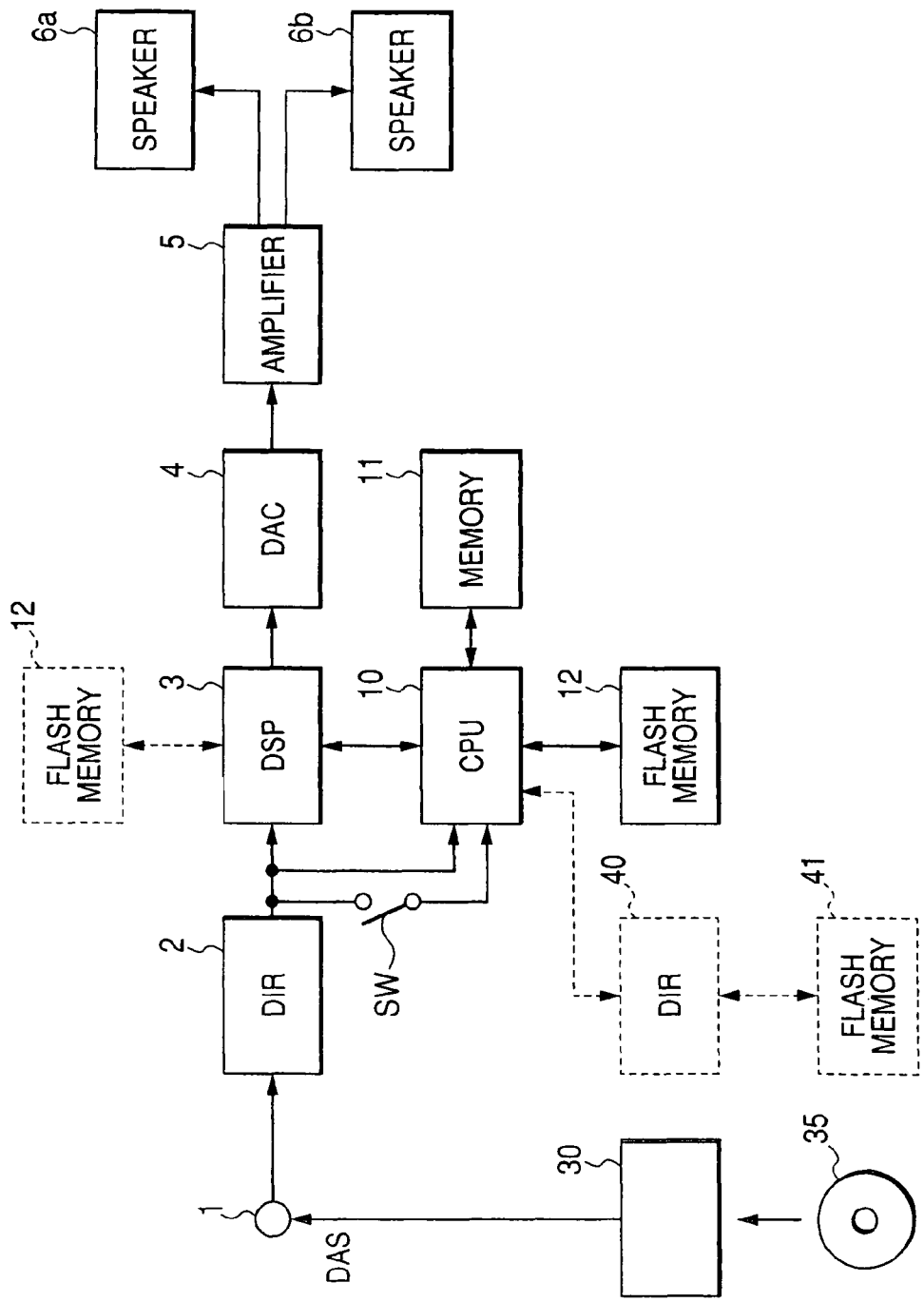
FIG. 1 is a block diagram showing the configuration of an embodiment of the present invention.

Description will be made below about an embodiment of the present invention. FIG. 1 is a block diagram showing the configuration of this embodiment. In FIG. 1, the reference numeral 1 represents an input terminal, to which a digital audio signal DAS according to the SPDIF (Sony/Philips Digital Interface Format) standard is input. The SPDIF standard is one of digital audio interface standards. In this embodiment, a CD player 30 reproduces a compact disk 35 and supplies the digital audio signal DAS according to the SPDIF standard to the input terminal 1.

Figure 2:
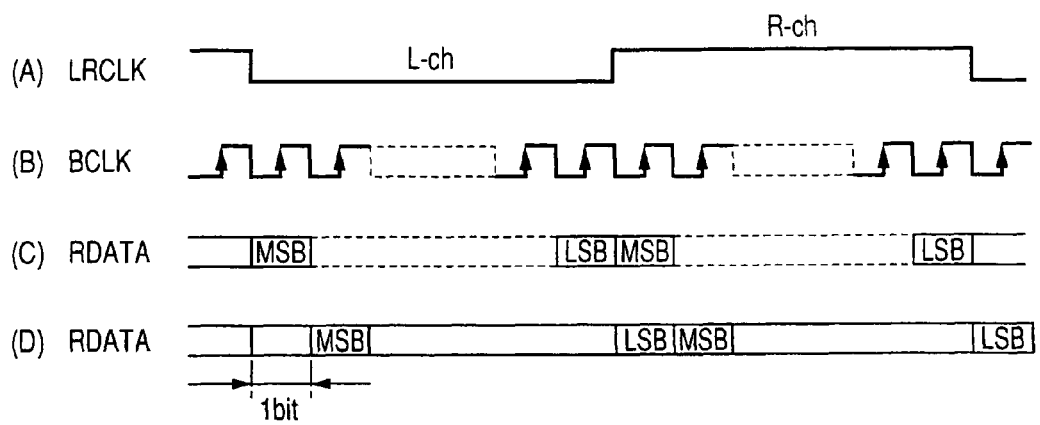
FIG. 2 is a waveform diagram showing a signal included in an I2S bus in the embodiment.

The digital audio signal DAS is converted into a signal conforming to an I2S bus (The Inter-IC Sound Bus) or the like by a digital interface receiver (hereinafter abbreviated to DIR) 2. The I2S bus is a standard generally used for transmitting/receiving 2CH (stereo) audio sampling digital data. As shown in FIG. 2, each signal contained in this bus includes a word clock LRCLK ((A) of FIG. 2) defining a frame, a bit clock BCLK ((B) of FIG. 2) indicating timing of each bit, and a data signal RDATA ((C) of FIG. 2) indicating the contents of data to be transferred. The word clock LRCLK has an L-level period indicating an L-ch (left channel) and an H-level period indicating an R-ch (right channel) as shown in (A) of FIG. 2. In the real I2S standard, the data signal RDATA is defined to be one-bit shifted from the trailing edge of the word clock LRCLK as shown in (D) of FIG. 2. However, description will be made on the assumption that the data signal RDATA is not shifted by any bit as shown in (C) of FIG. 2, in order to be understood easily.

In the I2S bus standard, data length per frame is not defined but set desirably. In this embodiment, the data length is set at 64 bits. In this embodiment, of 32 bits in each one-side channel, 16 bits are effective bits indicating the contents of the data, and the other bits are for control data or free (spare) bits. In order to simplify description, assume in the following description that each one-side channel has 16 bits and all the bits are effective bits (see FIG. 3).

The respective signals of the I2S bus are supplied to a digital signal processor (hereinafter referred to as DSP) 3, in which the data signal RDATA is read at the trailing edge timing of the bit clock BCLK. The read data signal RDATA is subjected to a decoding process, a sound field providing process, etc., for each channel. After that, the data signal RDATA is converted into analog signals by a DAC 4. The analog signals of the left and right channels output from the DAC 4 are amplified by an amplifier 5, and released from left and right speakers 6a and 6b.

Next, the reference numeral 10 represents a CPU for controlling each portion of the apparatus. The CPU 10 operates according to programs stored in a memory 11 and a flash memory 12. In this embodiment, firmware, data to be referred to by the CPU 10, an OS (Operating System), application programs, etc. are stored in the flash memory 12. The memory 11 is used as a work area of the CPU 10 or the like. The word clock LRCLK and the data signal RDATA are supplied from the DIR 2 to the CPU 10.

Figure 3:
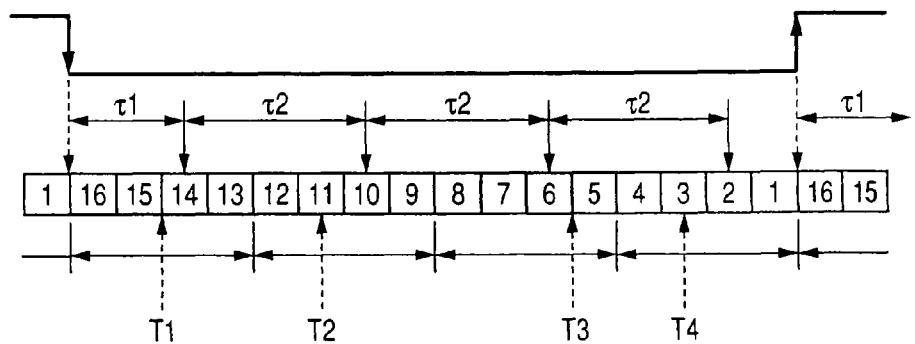
FIG. 3 is a timing chart showing timings when data are extracted from a digital audio signal in the embodiment.

Here, the CPU 10 reads the data signal RDATA in the following manner. That is, as shown in FIG. 3, the data signal RDATA is read at timing after a delay of a time $\tau 1$ from the trailing edge and leading edge of the word clock LRCLK, and then the data signal RDATA is read three times after a delay of a time $\tau 2$. In this example, the time $\tau 1$ is set to be a time about ⅛ as long as one frame, and the time $\tau 2$ is set to be a time ¼ as long as one frame. As a result, as shown in FIG. 3, the CPU 10 reads the data signal RDATA four times for each of L-ch and R-ch, that is, eight times in each frame. That is, data to be transferred normally at a rate of 32 bits per frame are read at a rate of 4 divided bits. In other words, each of segments separated by units of 4 bits is read once. Although the case of L-ch is shown in FIG. 3, reading is performed similarly also in the case of R-ch.

Figure 4:
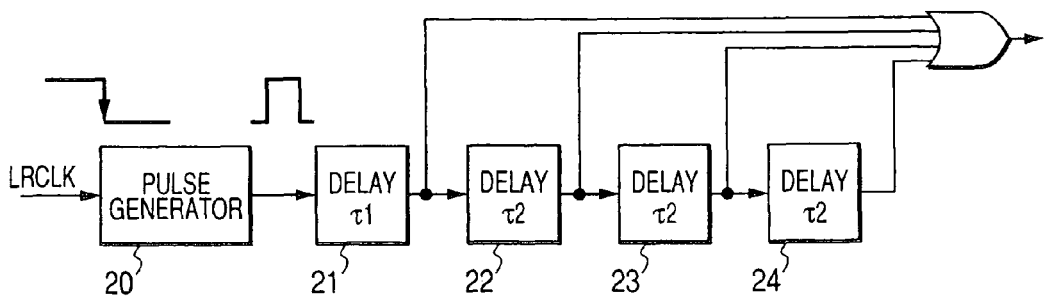
FIG. 4 is a block diagram showing a circuit example when data extracting timings are extracted by hardware in the embodiment.

The times $\tau 1$ and $\tau 2$ in the aforementioned reading process may be created by software processing of the CPU 10. Alternatively, the delay times may be set by hardware as shown in FIG. 4. In FIG. 4, the reference numeral 20 represents a pulse generator for generating a pulse in the trailing edge or leading edge of the word clock LRCLK; 21, a delay having a delay time set at $\tau 1$; and 22-24, delays each having a delay time set at $\tau 2$. From the circuit shown in FIG. 4, a pulse is output after the time $\tau 1$ from the trailing edge (or leading edge) of the word clock LRCLK, and a pulse is then output three times whenever the time $\tau 2$ has passed. These pulses are used as pulses for reading the data signal RDATA.

Here, another example will be described about the reading timing (sampling point) of the CPU 10. When the effective bit length (16 bits in FIG. 3) is divided into four as in this embodiment, the reading timing may be set at any timing as long as the timing is set in each segment. For example, the timing may be set between adjacent bits as in timing T1 shown in FIG. 3. This reason will be described. Consecutive "0" data or consecutive "1" data are disposed in each segment. Therefore, segmentation of bits gives no influence. The details of the layout of the data will be described later.

The reading timings in the respective segments may not be set to divide the bit length into four equal segments, like a circuit shown in FIG. 4. For example, the intervals of the timings may be inconsistent as in timings T1-T4 shown in FIG. 3. As for how to create the reading timings, therefore, a timing in each segment may be made, for example, using bit clocks BCLK. That is, the data signal RDATA may be read after a delay of two bit clocks BCLK from the start of a frame. After that, the data signal RDATA may be read at intervals of four bit clocks BCLK. Alternatively, reading timings may be set using bit clocks BCLK so that the reading timings are placed at inconsistent intervals and in the segments respectively. Not to say, reading timing may be designed to be set in the segments respectively by no use of the bit clocks BCLK.

Operation of Embodiment

Next, description will be made about the operation of this embodiment configured thus. First, when a compact disk 35 recording audio data is reproduced, a user sets the compact disk 35 in the CD player and gives an instruction to reproduce the compact disk 35. As a result, a digital audio signal is output from the CD player 30, and this digital audio signal is supplied to the DIR 2 through the terminal 1 and converted into an I2S bus signal in the DIR 2. The I2S bus data signal RDATA is subjected to various processes in the DSP 3, and then converted into analog signals in the DAC 4. The analog signals are output from the speakers 6a and 6b through the amplifier 5.

The CPU 10 reads the data signal RDATA at the timings shown in FIG. 3. When the data read thus and extracted do not show a predetermined command, the CPU 10 does not perform any process on the data extracted from the data signal RDATA, but controls the DSP 3 and the other portions of the apparatus according to programs.

Next, description will be made about a process for rewriting the firmware stored in the flash memory 12. First, the user sets a compact disk 35 recording new firmware in the CD player 30. In this case, the firmware is recorded in conformity with the normal compact disk standard, and the sampling rate thereof conforms to the compact disk standard. Data of the firmware read from the compact disk 35 are output to the I2S bus by the DIR 2 in the same manner as in the case of audio data.

Here, the data recorded in the compact disk 35 are set so that when one frame is divided into eight segments each having four bits, bits belonging to each segment have one and the same value. For example, when original data to be transferred are (1001) in the binary notation, first 4 bits of a data signal DA are (1111), which is followed by (0000), (0000) and (1111) likewise as shown in FIG. 5.

Figures 5, 6:
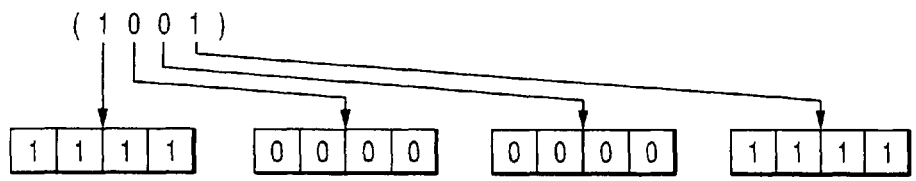
FIG. 5 is an explanatory diagram showing a processing method when rewriting data are embedded in each format of the digital audio signal in the embodiment.
FIG. 6 shows corresponding tables showing the contents of each frame when 4-bit division is carried out in the embodiment.

Table 1 shown in FIG. 6 shows values 16-bit data of L-ch (or R-ch) in this embodiment can have. In this Table 1, each row shows 16-bit data to be transferred at a time. As is understood from Table 1, identical values 1 or 0 are written in each segment divided by units of 4 bits.

Table 2 shown in the right side of FIG. 6 corresponds to Table 1. The first column in Table 2 shows values of 16-bit data of L-ch (or R-ch) in the hexadecimal notation. The second column of Table 2 is expressed in the decimal notation. The third column is expressed in the signed decimal notation when the most significant bits are sign bits. The fourth column shows data to be read by the CPU 10. Here, values of the signed decimal notation in the third column correspond to the signed amplitudes of digital audio data. In other words, the fourth column shows data embedded in 16-bit data.

In the aforementioned manner, the CPU 10 extracts data one bit by one bit at proper timings in consecutive 4-bit segments so as to recognize 4-bit data (0000)-(1111) from 16 bits of L-ch. Accordingly, the CPU 10 extracts and recognizes 8-bit data from 32-bit data of one frame consisting of L-ch and R-ch. The CPU 10 analyzes the data extracted thus, and recognizes the data as a command or recognizes the data as data of rewriting firmware.

The aforementioned description will be summarized. The effective bit length is divided into four segments. The data signal RDATA is read once in each segment. In the example of FIG. 3, the data signal RDATA is read once after a delay of the time τ1 from the trailing edge of the word clock LRCLK, and the data signal RDATA is then read three times at a timing after a delay of the time τ2. As a result, the CPU 10 reads the data signal RDATA eight times in one frame, and extracts 8-bit data. The CPU 10 analyzes the extracted 8 bits and performs a process for rewriting the firmware.

Here, an example of the process for rewriting the firmware will be described. In this embodiment, for example, an instruction of a series of rewriting steps is given in a format as shown in FIG. 13. In this example shown in FIG. 13, first (1) 10 or more samples of "0x00" are continued. (2) "0x55" is then disposed as a start identifier, and (3) 6-byte data indicating alphanumeric characters are disposed subsequently to the start identifier. The data of a string of characters each having one byte are, for example, set as a string of characters "S", "T", "A", "R", "T" and "!". Next, (4) data indicating the number of transmission data by two bytes and (5) a predetermined 2-byte command are disposed, and (6) rewriting data are continued subsequently thereto. Finally (7) a check sum of 2 bytes is attached.

According to the aforementioned format, data in the steps (1)-(3) are enumerated as 00, 00, 00, 00, 00, 00, 00, 00, 00, 00, 55, S, "T", "A", "R", "T" and "!". Data of 00 can appear at the beginning and end of a piece of music, but data perfectly coinciding with 56-bit data of 55, "S", "T", "A", "R", "T" and "!" can appear only with a probability of one by $2^{56}$, that is, about one by 72,000 trillion because each identical bit can appear with a probability of ½. That is, it is unlikely that the rewrite command will be recognized erroneously.

In the steps (4)-(7), the check sum of received data can be confirmed. There is no probability that all the data including the check sum will coincide.

When an instruction to rewrite is given thus, the rewriting data in the step (6) are rewritten in the flash memory 12. When the firmware is rewritten, rewriting software is moved from the flash memory 12 to the memory 11 and executed.

Next, give consideration to the noise which may be generated in this embodiment. Also during the aforementioned process for rewriting the firmware, the data signal RDATA is supplied to the DSP 3. Therefore, the process for generating sound by means of the DAC 4, the amplifier 5 and the speakers 6a and 6b is performed in parallel. This process is aimed not at music data but at firmware rewriting data as described above. Therefore, the generated sound becomes noise. In this embodiment, however, the generated noise is small as follows.

As shown in FIG. 6, the difference between the maximum value and the minimum value of the signed decimal number (corresponding to the amplitude of an audio signal) is "8191", which is "1FFF" in the hexadecimal notation. The number of bits required for expressing this difference is 13. On the other hand, data of each of L-ch and R-ch consist of 16 bits. It is therefore understood that the amplitude of a component serving as noise is 3 bits smaller than the total number of bits (16).

When the number of bits per segment (hereinafter referred to as the number of division bits) is x, the noise level with respect to the maximum amplitude of music data (hereinafter referred to as noise level simply) is expressed by:

$$20*\log(0.5^{(x-1)})dB$$

In this embodiment, therefore, the noise level is expressed by:

$$20*\log(0.5^3)dB$$

That is, the noise level is −18 dB. The sound serving as noise is comparatively low. There is no fear that a big signal may be supplied to the speakers suddenly when the firmware is being rewritten. In the same manner as mentioned above, even if the user reproduces the compact disk 35 recording the rewriting data by means of another playback apparatus erroneously, there is no fear that a big signal may be supplied to the speakers.

In the aforementioned embodiment, the data signal RDATA is divided and read. Accordingly, the data signal RDATA can be read satisfactorily by the CPU 10 even if the operating speed thereof is slow. Although the operating clock frequency of a CPU is generally lower than that of a DSP, this embodiment can be applied to such a case. Not to say, the embodiment can be applied more easily to the case where the operating clock frequency of a CPU is higher than that of a DSP.

Other Embodiments

The present invention can be carried out in various modes. Embodiments thereof will be described below.
1. Changing the Number of Division Bits Although the number of division bits was 4 in the aforementioned embodiment, the number of division bits may be set as 8-bit division with 8 bits per segment. Alternatively, it is possible to set 16-bit division where all the 16-bit data of L-ch and R-ch are formed out of bits having one and the same value.

Table 3 and Table 4 shown in FIG. 7 show the case of 8-bit division, corresponding to Table 1 and Table 2 shown in FIG. 6 respectively. As shown in Table 4, the difference between the maximum value and the minimum value of the signed decimal number (corresponding to the amplitude of an audio signal) is "511", which is "1FF" in the hexadecimal notation. The number of bits required for expressing this difference is 9. On the other hand, data of L-ch or R-ch consist of 16 bits. Thus, the amplitude of a component serving as noise is 7 bits smaller than that of the audio signal. The noise level in this case is therefore expressed by:

$$20*\log(0.5^7)dB$$

That is, the noise level is −42 dB. Thus, the sound serving as noise is very low.

Next, Table 5 and Table 6 shown in FIG. 8 show the case of 16-bit division, corresponding to Table 1 and Table 2 shown in FIG. 6 respectively. As shown in Table 6, the difference between the maximum value and the minimum value of the signed decimal number is only "1". The number of bits required for expressing this difference is only 1. The noise level in this case is expressed by:

$$20*\log(0.5^{15})dB$$

That is, the noise level is −90 dB. Thus, the sound serving as noise is too low to hear.

In the embodiments shown in FIGS. 7 and 8 the effect of division is greater than that in the aforementioned embodiment. Therefore, those embodiments are preferable when a slower CPU is used. As for applications of the present invention, the number of bits of each one-side channel per frame is not limited to the number shown in the aforementioned embodiment. The present invention can be applied to various numbers of bits such as 16 bits, 24 bits, 32 bits, 64 bits, etc. As for the effective bit length in the total number of bits in each one-side channel, the present invention can be applied to any number of bits. That is, all the bits of each one-side channel may be effective bits, or any number of bits may be effective bits.

Next, description will be made about the point that increase of the number of upper bits is effective in reduction of noise level. Here, description will be made about the case where each one-side channel has 24 bits.

Figure 9:
FIG. 9 shows corresponding tables showing the contents of each frame in a mode of division when each frame has 24 bits in the embodiment.

Table 7 and Table 8 shown in FIG. 9 show the case where the number of bits in each channel is 24 and the number of division bits is 4. Table 7 and Table 8 correspond to Table 1 and Table 2 shown in FIG. 6 respectively. As shown in Table 8, the difference between the maximum value and the minimum value of the signed decimal number is "2097151". The number of bits required for expressing this difference is 21. The noise level in this case is −18 dB.

Figure 10:
FIG. 10 shows corresponding tables showing the contents of each frame in a mode of division when each frame has 24 bits in the embodiment.

On the other hand, Table 9 and Table 10 shown in FIG. 10 correspond to Table 7 and Table 8 in FIG. 9. In Table 9 and Table 10, only four bits extracted from 24 bits of each one-side channel are read. The lower side of the data signal RDATA is divided into 4-bit segments while the upper side is set as a 12-bit segment. In this manner, the difference between the maximum value and the minimum value of the signed decimal number is only "8191" as shown in Table 10. The number of bits required for expressing this difference is only 13. The noise level in this example is −66 dB. It is understood that the noise level is extremely reduced as compared with that in the case shown in FIG. 9.

In order to reduce the noise, it is also effective to use a manner in which the upper bits of the data signal RDATA are not used (but they are set as 0 initially). The sound pressure becomes ½ as low as the original maximum amplitude whenever one bit closer to other most significant bit is not used. The same thing can be applied to the noise. FIG. 11 shows the degree with which the sound pressure level of noise is reduced whenever one bit closer to the most significant bit is not used.

2. Concurrent Music Reproduction

Although rewriting was performed using a firmware or reference data rewriting CD in the aforementioned embodiment and the other embodiments, rewriting can be performed while music or the like (music, guide voice, etc.) is reproduced. For example, when each one-side channel has 16 bits, the lower 8 bits are used as rewriting data while the upper 8 bits are used for reproducing music. Of the 16-bit data indicating tones, the upper side has great influence on the amplitude. Therefore, even when the lower bits are used for rewriting data, slight deterioration in sound quality, if any, can be prevented from being felt by human ears. Whether the human ears can feel the deterioration or not depends on the number of lower bits used for rewriting. There is no problem if the number of bits is proper. In this case, there is a great effect when the music to be reproduced has a musical composition with amplitude as large as possible.

Give consideration to the noise which may be generated in this case. As shown in Table 11 of FIG. 12, the lower 8 bits become a noise component. Here, Table 11 and Table 12 shown in FIG. 12 correspond to Table 1 and Table 2 in FIG. 6. The difference between the maximum value and the minimum value of the signed decimal number in this case is "255". The number of bits required for expressing this difference is 8. Therefore, noise corresponding to 8 bits is generated. That is the same number of 8 bits as the number of bits used for rewriting the firmware. Thus, there is no effect of noise reduction. The noise level is −48 dB.

3. Mode of Rewrite Command

Figure 14:
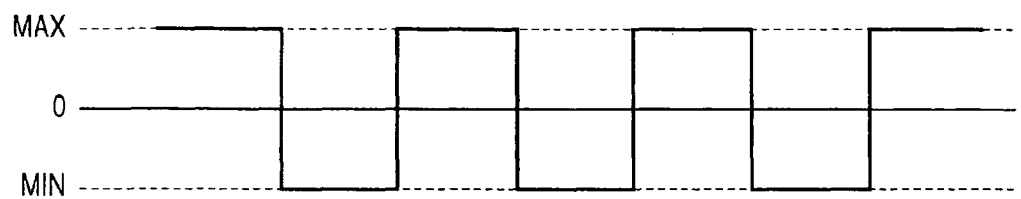
FIG. 14 is a waveform diagram showing another example of recognition of a rewrite command.
Figure 15:
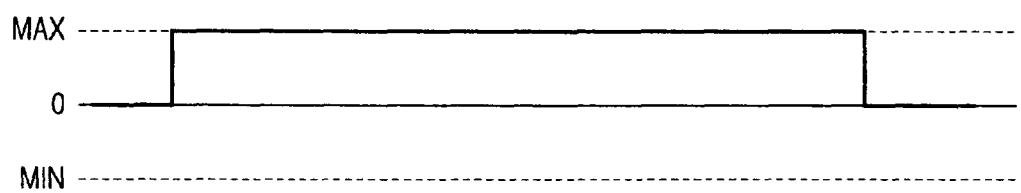
FIG. 15 is a waveform diagram showing another example of recognition of a rewrite command.

The method for giving an instruction to rewrite in the aforementioned embodiment is only one instance. There are various other methods. For example, a command or a command recognition pattern shown in FIG. 14 shows an example in which a pattern with a maximum value and a minimum value repeated alternately is used as a command to start rewriting. Such a pattern cannot appear in music data. FIG. 15 shows an example in which a pattern with a maximum value continued for a time not shorter than a predetermined time is used as a command to start rewriting. Alternatively, mutes (0 data) may be disposed with a predetermined pattern so that a mute pattern with a predetermined interval is regarded as a rewrite recognition pattern when the mute pattern can be recognized.

4. Others (i) In the aforementioned embodiment, the present invention was applied to an audio amplifier. However, the present invention is not limited to this, but it can be applied to various audio apparatuses (electronic apparatuses) such as a CD player, a DVD player, an MD player, an HDD (Hard Disk) player, a memory player, etc., or various electronic apparatuses mounted with CPUs, other than the audio apparatuses. Not to say, the present invention can be applied to personal computers.

(ii) The aforementioned embodiment was aimed at an apparatus for performing processing on digital audio signals according to the SPDIF standard. However, the present invention may be applied to digital signals of another format than this. After all, it will go well if data located at predetermined timings in one frame with a predetermined format are extracted and a rewriting process is carried out on the extracted data. In addition, the frequency of the word clock LRCLK may be changed. For example, the frequency may be 44.1 kHz or 48 kHz.

(iii) The present invention can be applied not only to data read from a recording medium such as CD or DVD but also to data supplied, for example, through a predetermined cable or the Internet. That is, digital signals generated by the digital signal generating method according to the present invention may be transferred without the aid of any recording medium.

(iv) Various division forms may be used as shown in FIGS. 6-8. For example, data of a plurality of division forms may be recorded in a CD so that data corresponding to the throughput of the CPU can be selected to perform a rewriting process. In this case, when data showing a division form are included as a rewrite command, the CPU can start rewriting as soon as the CPU detects a command meeting its own speed. The same thing can be applied to the case where digital signals are supplied through the Internet or the like.

(v) In the aforementioned embodiment, the DSP and the CPU are provided. The DSP serves as a processing means for processing a digital audio signal (digital signal with a predetermined format). The CPU controls each portion of the apparatus, and serves as an extracting means for extracting data located at predetermined timings from a frame of the digital audio signal and as a rewriting means for analyzing the extracted data and performing rewriting. However, the CPU may also serve as the processing means (in a mode where the DSP is not provided separately), and implement the extracting means and the rewriting means in different circuits etc.

(vi) The DIR 2 and the CPU 10 may be connected through a switch SW as designated by the broken line in FIG. 1. In this case, the switch SW is turned on only when firmware is rewritten. Alternatively, the switch SW may be turned on when an operator operates the switch etc. or may be turned on by software processing based on a program.

(vii) In each of the aforementioned embodiments, a digital signal with a predetermined format consisting of m bits per frame may be read based on bit clocks BCLK directly with the format of m bits, or may be read likewise as a signal divided into n segments. Accordingly, it is possible to mix a process for reading the digital signal directly as the format of m bits and a process for extracting data as a signal divided into n segments so as to rewrite a program. In some modes of mixing the processes, time-division processing may be performed, or concurrent processing may be performed. In this case, when the digital signal is read based on the bit clocks BCLK directly with the format of m bits by the DSP and, of the read data, data located in predetermined bit positions are extracted, both the m-bit reading process and the divided signal reading process can be achieved only by the DSP.

(viii) In the embodiment shown in FIG. 1, the CPU 10 extracted rewriting data, and the CPU 10 also performed rewriting control. However, CPU 10 may analyze the extracted data and send a rewrite command to the DSP 3 so that the DSP 3 can perform the rewriting process. Further, the CPU 10 may transfer all the extracted data to the DSP 3 so that the DSP 3 can analyze the extracted data and rewrite firmware (or data). In this case, as designated by the broken line in FIG. 1, the DSP 3 performs the rewriting process on the flash memory 12 connected to the DSP 3. In addition, as designated by the broken line in FIG. 1, the CPU 10 may be designed to output the extracted data as they are, while another CPU 40 analyzes the extracted data supplied thereto and rewrites firmware or data stored in a flash memory 41 or the like.

(ix) The CPU 10 shown in FIG. 10 may be replaced by a CPU chip including a flash memory, a RAM or the like so as to rewrite firmware or data in the flash memory or the RAM.

(x) Although the I2S standard was used in the embodiment shown in FIG. 1, the present invention is not limited to this standard. Various other formats can be used.

Figure 16:
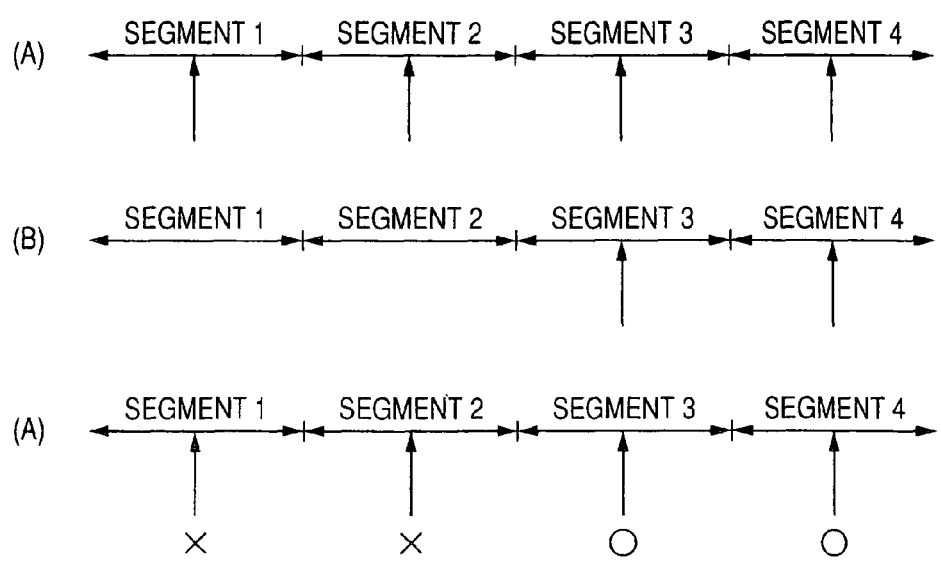
FIG. 16 is a timing chart showing another example of reading timings.

(xi) The reading timings of the CPU are not limited to those in the modes shown in the embodiments. For example, it will go well if one reading timing is set in each segment when each one-side channel is divided into four segments (more exactly when the effective bits of each one-side channel are divided into four segments) as shown in (A) of FIG. 16. However, reading timing may be set only for the segments 3 and 4 (corresponding to lower 2 bits) of the four segments as shown in (B) of FIG. 16. Consecutive "0" or "1" data are written in the segments 3 and 4 in this case, while any data may be written in the segments 1 and 2. As shown in (C) of FIG. 16, a reading timing may be set for each segment while the data extracted in the segments 1 and 2 are ignored and not used but only the data read in the segments 3 and 4 are used as extracted data. In this case, any data may be written in the segments 1 and 2 in the same manner as in (B) of FIG. 16.

Here, the reading timings can be summarized as follows. First, the reading timings are sampling points set for respective segments when the effective data length in one frame is divided into N segments (in the case of (A) of FIG. 16). Alternatively, as shown in (B) of FIG. 16, the reading timings are sampling points set for M (M is smaller than N) segments when the effective data length in one frame is divided into N segments. Alternatively, as shown in (C) of FIG. 16, a process for analyzing a command etc. and performing rewriting may be performed so that, of the read and extracted data, data located in specific timings are ignored.

The invention claimed is:

1. An electronic apparatus having a CPU for controlling each portion of the apparatus, the apparatus comprising:
   a storage unit that stores firmware for operating the CPU;
   an input terminal complying with a digital audio interface standard for receiving a digital audio signal;
   a processing unit that performs a predetermined process on the digital audio signal received by the input terminal;
   an extracting unit that extracts data located at predetermined timings in one frame of the digital audio signal received by the input terminal, and outputs the extracted data as extracted firmware data; and
   a rewriting unit that analyzes the extracted form data and rewrites the firmware in the storage unit based on a result of the analysis and the extracted firmware data,
   wherein the CPU serves at least as the extracting unit,
   wherein the one frame has an effective data length of N segments, and
   wherein the predetermined timings are located in sampling points set in at least one of the N segments.

2. The electronic apparatus according to claim 1, wherein the CPU further serves as the rewriting unit.

3. The electronic apparatus according to claim 1, wherein the CPU supplies the extracted firmware data to the processing unit, and the processing unit serves as the rewriting unit.

4. The electronic apparatus according claim 1, further comprising:
   a buffer storage unit that stores the extracted firmware data temporarily,
   wherein the rewriting unit analyzes the extracted data stored in the buffer storage unit sequentially, and rewrites the firmware in the storage unit based on a result of the analysis and the extracted firmware data in the buffer storage unit.

5. The electronic apparatus according to claim 1, wherein the predetermined timings are located in sampling points set in each of the N segments.

6. The electronic apparatus according to claim 1, wherein the predetermined timings are located in sampling points set in M segments among the N segments, where M is smaller than N.

7. The electronic apparatus according to claim 1, wherein the rewriting unit performs the analysis and the rewriting the firmware while ignoring, of the extracted data extracted by the extracting unit, data located in specific timings.

8. The electronic apparatus according to claim 5, wherein:
   each of the segments has a same number of bits, and
   bits belong to each segment have the same value.

* * * * *